United States Patent [19]

Campbell et al.

[11] Patent Number: 4,989,970

[45] Date of Patent: Feb. 5, 1991

[54] NON-CONTACT SENSING APPARATUS AND METHOD FOR TEMPERATURE PROFILE AND THICKNESS DETERMINATION AND CONTROL OF RADIATION TRANSLUCENT MATERIALS

[76] Inventors: Gregory A. Campbell, R.D. #2, Box 318, Canton, N.Y. 13617; Bangshu Cao, P.O. Box 135; Paul A. Sweeney, 9 Washington St., Apartment 1, both of Potsdam, N.Y. 13676

[21] Appl. No.: 343,278

[22] Filed: Apr. 26, 1989

[51] Int. Cl.$^5$ .................. G01N 21/01; G01J 5/28; G01J 5/06; G01B 11/06
[52] U.S. Cl. ........................................ 356/73; 356/43; 356/382; 374/126
[58] Field of Search .................. 356/72, 73, 239, 256, 356/355, 436, 381, 357, 43, 45, 382; 374/1, 10, 126, 161; 250/339

[56] References Cited

U.S. PATENT DOCUMENTS 4,502,793 5/1988 Smith et al. .............................. 374/2
4,522,510 9/1985 Rosencwaig et al. ................. 356/43

Primary Examiner—Vincent P. McGraw
Assistant Examiner—La Charles P. Keesee

[57] ABSTRACT

A device and method are provided for determining the bulk (average) temperature, surface temperature, temperature profile, and thickness of radiation translucent materials. These material functions are determined by evaluation of the intensity of the radiation emitted from the material using two detectors with a radiation source placed in the optical path of one of the detectors. The data is taken at several intensities of source radiation and reduced to obtain the bulk temperature and material thickness. The second detector is used to measure the surface temperature. These data are then used to determine the temperature profile in the material.

14 Claims, 4 Drawing Sheets temperature profiles

NON-CONTACT SENSING APPARATUS AND METHOD FOR TEMPERATURE PROFILE AND THICKNESS DETERMINATION AND CONTROL OF RADIATION TRANSLUCENT MATERIALS

BACKGROUND OF THE DISCLOSURE

The present invention is related to the determination of temperature and the measurement of temperature profiles in stationary and flowing radiation translucent materials. In particular, the present invention is related to a non-contact means for determining temperatures, temperature profiles and material thicknesses of such materials using transmitted and emitted electromagnetic radiation in a selected wavelength range.

Precise measurement and control of material temperature during processing is essential to ensure consistent physical properties in the final product. Traditionally, thermocouples have been used to obtain an indication of material temperatures. Such measurements, however, are prone to errors due to several factors; frictional heating of the probe in a flowing system, heat transfer to the thermocouple can also contribute to erroneous temperature indications. Also, thermocouples cannot be applied to materials such as thin films as they are an intrusive device. It is thus seen that thermocouples immersed in materials are not wholly satisfactory instruments for determining temperature because of erroneous measurements arising from frictional heating of the thermocouples themselves.

Additionally, such thermocouples generally exhibit a relatively slow response time. Moreover, surface temperature measurements performed on polymer melts using emitted radiation are limited because this measurement method is based on the fact that, at certain wavelengths, polymers behave like opaque materials. While this, phenomena enables one to determine the temperature of a given surface by measuring the radiation intensity emitted from that surface, it none the less does not provide any means for determining interior temperatures which may, in fact, be more critical for controlling ultimate material properties.

Recently, infrared detectors have been employed in a limited fashion to measure polymer surface temperatures. However, such infrared detectors have not been useful in obtaining accurate bulk temperature and temperature profiles. Their use has been confined to surface temperature measurement. See "Infrared Radiation Techniques for Glass Surface and Temperature Distribution Measurements", by R. Viskanta in the IEEE Trans. Indust., Appl. Vol 1A-11, No. 5 (1975).

A method to estimate bulk temperature has recently been described, U.S. Pat. No. 4,516,864. This method has limitations due to the necessity to characterize the polymer temperature absorbance coefficient at the wavelength of the collimated sources. A further difficulty with this invention is its inability to deal with the effect of polymer thickness on emissivity.

Therefore, it is apparent that a method and apparatus be developed that provides accurate non-contact measurement of internal temperature and temperature profile of materials without previous knowledge of their thickness or radiation interaction characteristics.

SUMMARY OF THE INVENTION

In accordance with the preferred embodiment of the present invention, an apparatus for measurement of the temperature of radiation translucent materials, constrained and unconstrained, flowing and non-flowing provided there exists an optical path length through said material. Means are provided for irradiating the material and additional means are provided for detecting the level of radiation emitted from the material. Said material is placed in an optical path between the means of irradiation and the means of radiation detection. Knowledge of the surface temperature and the bulk temperature are utilized to calculate the film temperature profile, which is often not parabolic, by computational means based on either numerical or analytical techniques.

In the preferred embodiment of the present invention, the means of irradiation for the radiation translucent materials is a radiation source with variable intensity. The radiation detector is arranged in such a manner that the radiation source and the detector are aligned in an optical path. The source radiation intensity is altered to two or more levels and the temperature is determined using a calculation method such as a computer program without previous knowledge of material thickness or the temperature dependence of the material apparent transmissivity. The data can also then be used to determine the thickness of the radiation translucent materials.

Furthermore, in accordance with another embodiment of the present invention, a method for the simultaneous bulk and surface temperature measurement of a radiation translucent material. This is comprised of a radiation source and a detector which operates in a range where the energy can be detected through the material for the bulk temperature measurement and a second detector where the energy detected is only from or near the surface, for measurement of the material surface temperatures. These measurements are combined with heat transfer analysis to predict a temperature profile across the radiation translucent material.

Accordingly, it is an object of the present invention to provide a non-contact apparatus and method for measuring the temperature variation across a radiation translucent material.

Thus, it is also an object of the present invention to provide a non-contact apparatus and method for determination of the temperature profile within flowing radiation translucent materials.

It is yet another object of the present invention to provide an apparatus for measuring the thickness of a radiation translucent material without knowledge of its temperature.

It is also another object of the present invention to provide an apparatus for measuring the thickness of a flowing radiation translucent material without knowledge of its temperature.

It is yet another object of the present invention to provide better temperature control in radiation translucent materials processing to thereby produce improved products.

DESCRIPTION OF THE FIGURES

The subject matter which is regarded as the invention is particularly pointed out and distinctly claimed in the concluding portion of the specification. However; the invention, both as to organization and method of practice, together with further objects and advantages thereof, may best be understood by reference to the following description taken in connection with the accompanying drawings:

DETAILED DESCRIPTION OF THE INVENTION

Figure 1:
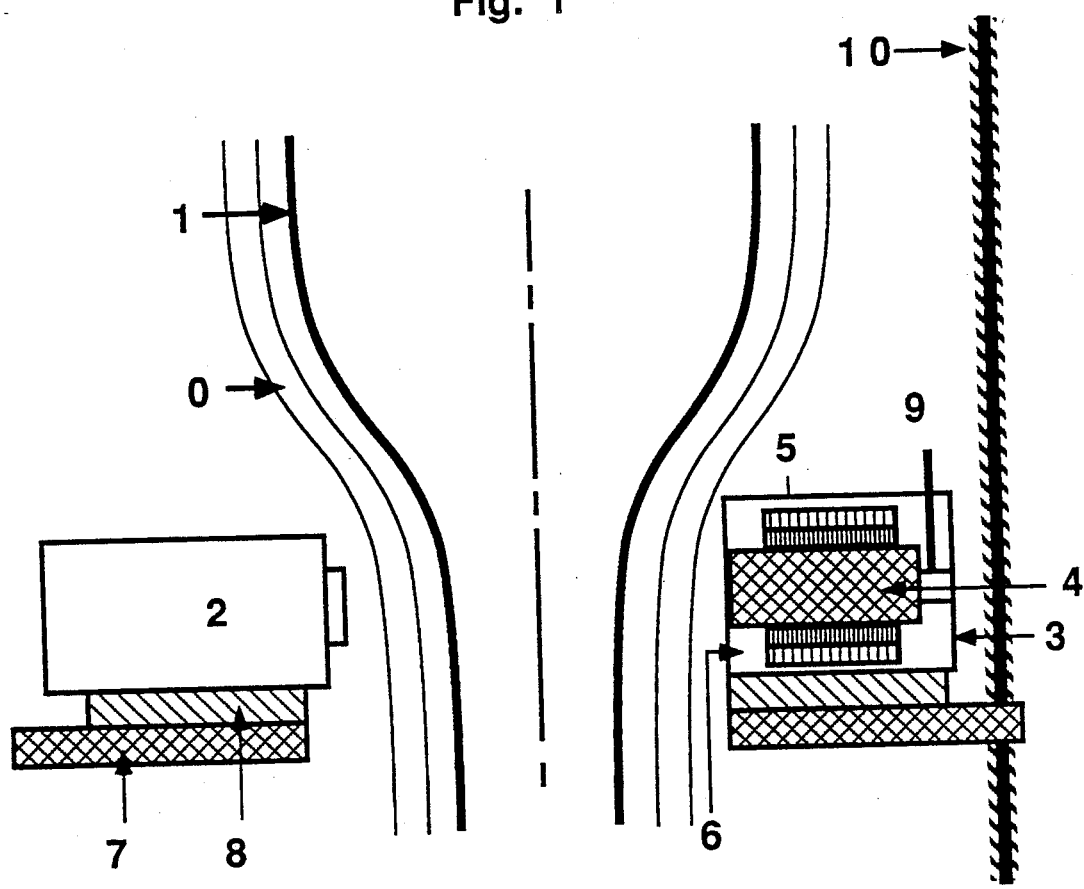
FIG. 1 is a schematic diagram containing a cross-sectional side view illustrating a preferred embodiment of the apparatus of the present invention.
Figure 3:
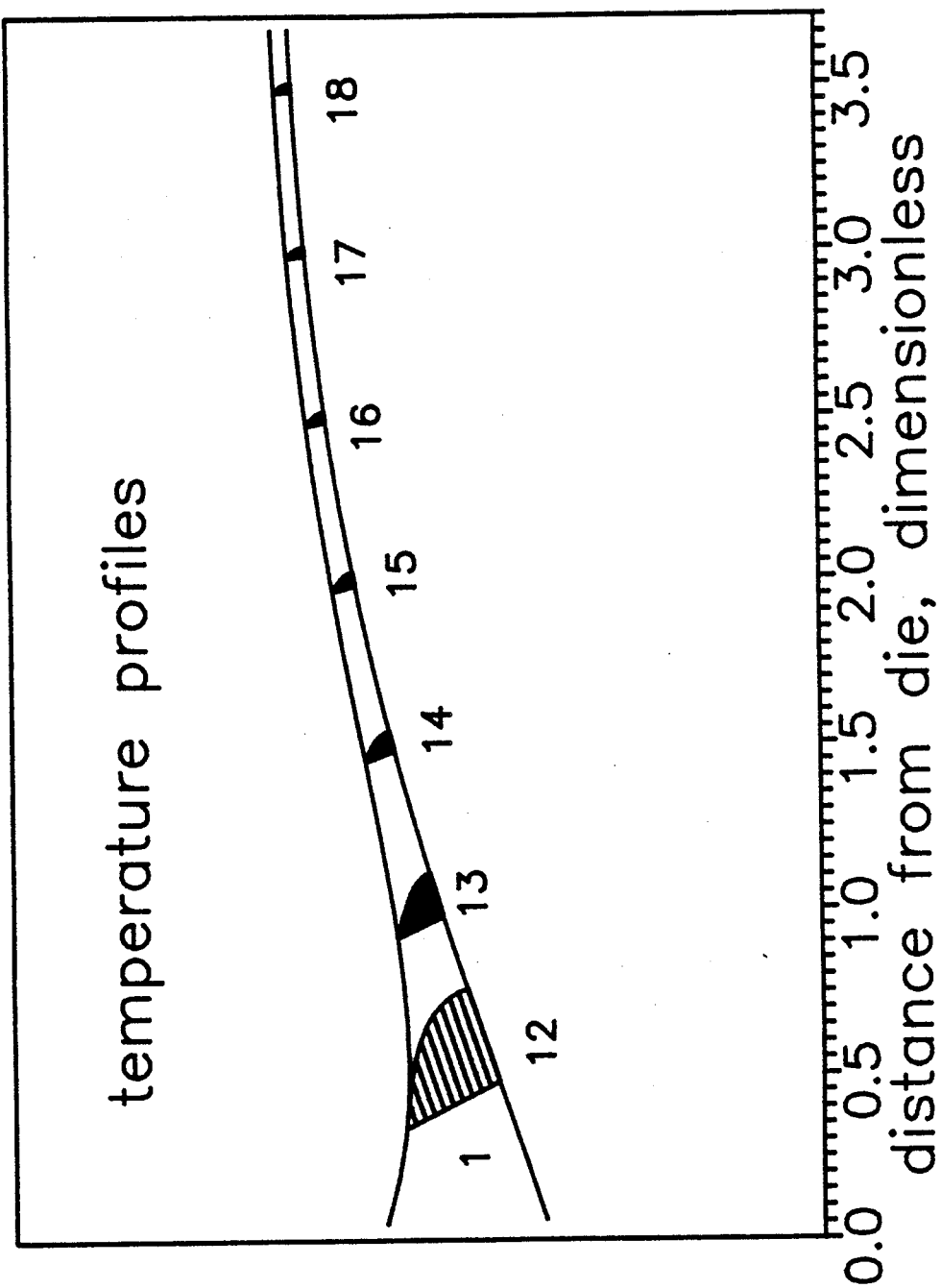
FIG. 3 is a schematic drawing illustrating typical material thickness and temperature distributions for a radiation translucent materials.

FIG. 1 illustrates a portion of a flowing radiation translucent material, such as a blown film bubble 1, the details of the material 1 are found in FIG. 3. In many cases the temperature profile will not be parabolic 12 to 18 and will change dramatically as a function of film thickness. In the apparatus and method of the present invention, temperature profiles are determined in radiation translucent materials 1 by irradiating the radiation translucent materials with varying intensity of radiation and recording the radiation received at the detector. The intensity of the radiation received at the detector is a combination of the energy transmitted through the material from the radiation source and that emitted from the material itself which will be a function of temperature and thickness of the material. It can be shown that the radiation transmitted through the material is more or less a linear function of the radiation emitted from a source such as a black body. By determining the slope and the intercept, the relationship between the radiation received from the radiation source after passing through the film and the intensity of the radiation source is known. Applying Kirchhoff's law, the radiation energy conservation law and the Stefan-Boltzmann law, the temperature and thickness of the material can be determined. This technique is not wavelength limited with the exception that the radiation must partially pass through the material. The relationships relating temperature and radiation intensity are more particularly discussed below.

Figure 2:
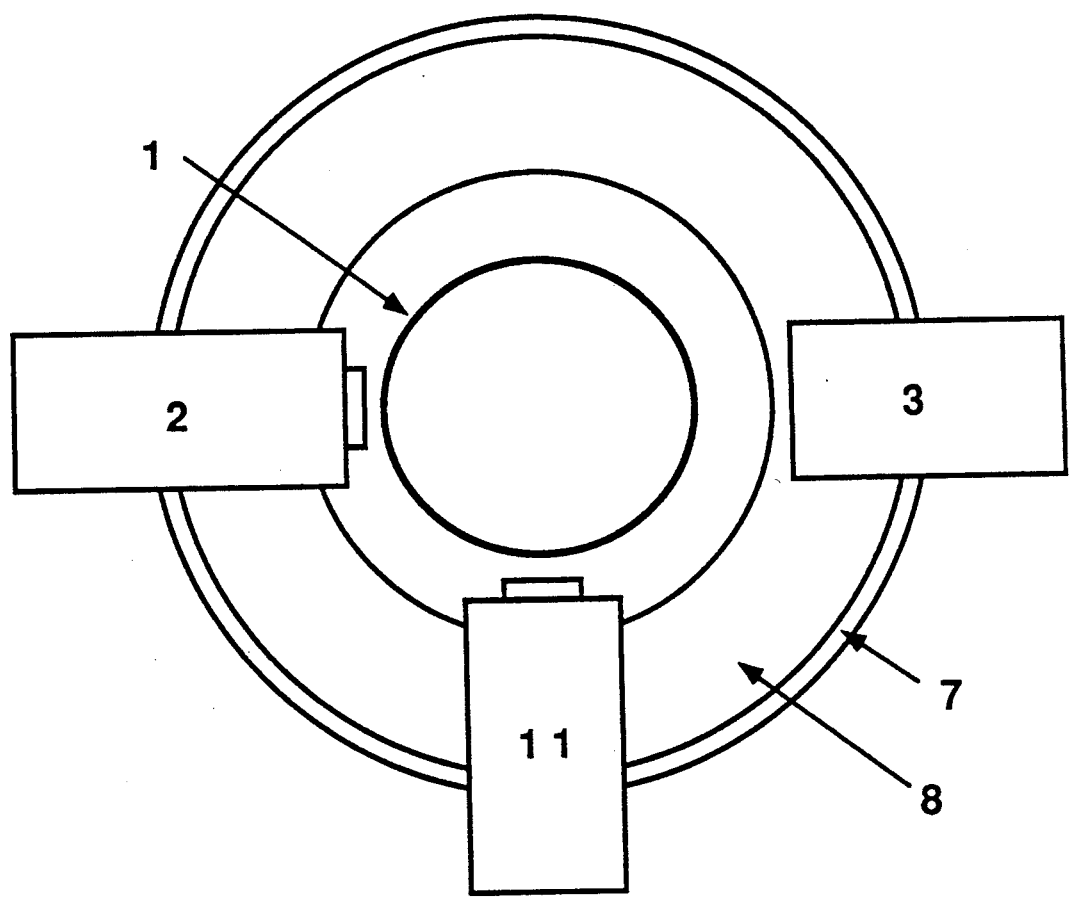
FIG. 2 is a schematic drawing containing a top view illustrating a preferred embodiment of the apparatus of the present invention.

An apparatus for carrying out the purposes of this invention is particularly illustrated in FIG. 1 and FIG. 2 when applied to the blown film process. Typically an infrared sensor 2 is placed in the optical path of the radiation source 3 and the melt 1 is located in the optical path between 2 and 3. The sensor has a radiation wavelength response such that it is sensitive to radiation wavelengths that can pass through the material from the radiation source 3. The intensity of the radiation from the radiation source 3, either a laser, a filtered source or a similar device, in this case the radiation is emitted from the black body 4. The temperature and therefore the radiation intensity of the black body 4 is controlled by manipulation of a cooler 5 and a heater 6. The collimated source of radiation $i_o$, preferably operating in the infrared region of the spectrum, is mostly absorbed by the film 1 and subsequently some of the radiation $i_E$ is emitted from the film surface and received by the sensor 2, typically a device with a photocell, photodetector, phototransistor or similar device which operates to generate an electrical signal output in response to the intensity of level of electromagnetic radiation emitted by film 1. The temperature of the black body 4 is monitored by thermal couple 9 and $i_o$ is related to the black body 4 temperature through the Stefan-Boltzmann law. Sensor 2 has an output that is proportional to the radiation received and this output is preferably converted, conditioned, and recorded using the approprite electronics and a computer.

In one embodiment of the present invention, it is desirable to have an indication of the surface temperature on one or both side of the film. This is demonstrated for a single surface measurement in FIG. 2. The surface temperature of the melt is monitored using a 3.43 micron sensor 11 since most polymers are infrared opaque at this wavelength. Sensor 11 has an output that is proportional to the radiation received and this output is preferably converted, conditioned, and recorded using the appropriate electronics and a computer.

In one embodiment of the present invention, it is desirable to have an indication of the film thickness. Thickness can be determined using Sensor 2 whose output is proportional to the radiation received and these outputs are converted, conditioned, and recorded using appropriate electronics and a computer. The apparent emissivity of the film and bulk temperature are the calculated from the data obtained using Sensor 2. The apparent emissivity of a material has a relationship with the material thickness and temperature. As an example, in FIG. 4, polyethylene has an apparent emissivity-thickness relationship 19, 20, 21 at 120°, 150°, and 190° C. respectively. Using the calculated apparent emissivity and temperature the thickness is determined using this type of a relationship.

In one embodiment of the present invention, it is desirable to have an indication of the surface and bulk temperature of the material and film thickness as a function of position. In the case of the blown film temperature measurement, the devices, 2 3 and 11, are mounted on a structure 8 which can be rotated around a support 7 that can be translated in a direction normal to plane of 7 by the structure 10 which allows the melt temperature to be measured from the die to the nip rolls and around the circumference of the film. Sensors 2 and 11 have outputs that are proportional to the radiation received and these outputs are converted, conditioned, and recorded using appropriate electronics and a computer. Apparent emissivity and temperature are then calculated from the recorded data and the film thickness is determined using these values and the previously determined relationship between material temperature, apparent emissivity and thickness.

Again, in one embodiment of the present invention, it is desirable to have an indication of the temperature of both of the surfaces and of the bulk of the material as a function of position and to calculate the temperature profile in the film as a function of position. In the case of blown film temperature measurement in addition to the devices, 2 3 and 11, which are supported by a structure 8 which can be rotated around a support 7 that can be translated in a direction normal to the plane of 7 by the structure 10, a second sensor similar to sensor 11 is installed within the bubble along with the means to rotate this sensor about its axis as well as the means to translate this sensor in a direction normal to the plane of the external support ring 7. This physical set up allows the internal and external surface temperature along with the bulk temperature to be measured from the die to the nip rolls and around the circumference of the film. All of the sensors have outputs that are proportional to the radiation received and these outputs are converted, conditioned, and recorded using appropriate electronics and a computer. The computer is programmed to evaluate the non-linear heat transfer analysis and generate temperature profiles. Typical profiles for the blown film process are found in FIG. 2. 12 through 18.

A key factor in the present invention is the ability to determine the apparent emissivity, temperature and material thickness without being required to choose of a narrow irradiation wavelength range in conjunction with an off-line determination of the apparent transmissivity-temperature function, as described in U.S. Pat. No. 4,516,864.

Starting with the radiation energy conservation law:

$$\epsilon + \tau + \rho = 1 \quad [1]$$

where:
$\epsilon$ = apparent emissivity
$\tau$ = apparent transmissivity
$\rho$ = apparent reflectivity At thermal equilibrium Kirchhoff's law states:

$$\text{Absorption} = \text{Emission} \quad [2]$$

Thus the energy the material absorbs from 3 will be emitted by 1 to be collected by 2. In the following discussion the subscript 'm' will denote the material 1, 'b' will denote the black body 6, 'a' will denote the ambient conditions, 's' will denote sensor, and 'R' will represent total radiation energy. Then an energy balance for the optical path between 2 and 3 yields:

$$R_s = R_m \epsilon_m + R_b \epsilon_b \tau_m + R_a \epsilon_a \rho_m \quad [3]$$

Since the ambient radiation energy and the apparent reflectivity of the material are relatively small, equation 3 becomes:

$$R_s = R_m \epsilon_m + R_b \epsilon_b \tau_m \quad [4]$$

Since $R_m \epsilon_m$ and $\epsilon_b \tau_m$ are constant, this is a linear equation relating $R_s$ and $R_b$. The intercept is the product of the material's radiation energy and the material's apparent emissivity. The slope is the product of the black body's apparent emissivity and the material's apparent transmissivity. Since we know the black body's apparent emissivity we can easily determine the material's apparent transmissivity if the slope in equation 4 is known. The apparent reflectivity of materials is not very temperature sensitive and has been tabulated for many materials. Thus using these two known values, apparent reflectivity and apparent transmissivity, we can use equation 1 to obtain the material's apparent emissivity. Then, using the intercept we obtain the black body radiation equivalent for the material. This is used in the Stefan-Boltzmann equation to obtain the material temperature.

$$R = \int_{\lambda_1}^{\lambda_2} ((C_1/\lambda^5) \exp(-C_2/\lambda T)) d\lambda \quad [5]$$

where $C_1$ and $C_2$ are physical constants. Knowing the bulk temperature we can obtain the material thickness using the data of the type shown in FIG. 4.

As an example of the use of this invention in conjunction with the processing of blown film, we carried out two experiments on our laboratory film line. This is important in blown film since the property development and the stability of the process are dependent on knowing and controlling the film temperatures. The surface temperature was measured by a 3.43 micron detector. The bulk temperature was calculated using a variable temperature black body 3 and 1.8 to 3.0 micron detector 2 with the recorded data being analyzed in the manner described in the preceding paragraphs. In the first experiment the cooling air was turned off. The following data were taken using the die position as a reference for measurement.

TABLE 1

Blown Film Surface and Average (Bulk) Temperatures
No Cooling Air

| POSITION (cm) | SURFACE TEMPERATURE (°C.) | AVERAGE TEMPERATURE (°C.) | THICKNESS MICRON |
|---|---|---|---|
| 4 | 163 | 161 | 116 |
| 6 | 149 | 149 | 59 |
| 8 | 136 | 137 | 37 |
| 10 | 128 | 129 | 22 |
| 14 | 110 | 111 | 14 |

It is apparent from the data, Table 1, that the surface and bulk temperatures were essentially the same. It should be pointed out that these are average temperatures and that the surface temperature had a range of ±6 degrees about the mean while the average (bulk) film temperature had a range of ±1 degree. The thickness is shown to decrease as the distance increases from the die.

In the second experiment the air O FIG. 1 was applied to the outside of the film. Similar measurements were made as in the previous example and the data are reported on Table 2.

TABEL 2

Blown Film Surface and Average (Bulk) Temperatures
Cooling Air Applied

| POSITION (cm) | SURFACE TEMPERATURE (°C.) | AVERAGE TEMPERATURE (°C.) | THICKNESS MICRON |
|---|---|---|---|
| 14 | 99 | 117 | 10 |
| 18 | 90 | 101 | 8 |
| 22 | 89 | 103 | 6 |

It is apparent that the surface temperature is smaller than the average (bulk) temperature and again the temperature ranges are the same as found in the previous example.

Figure 4:
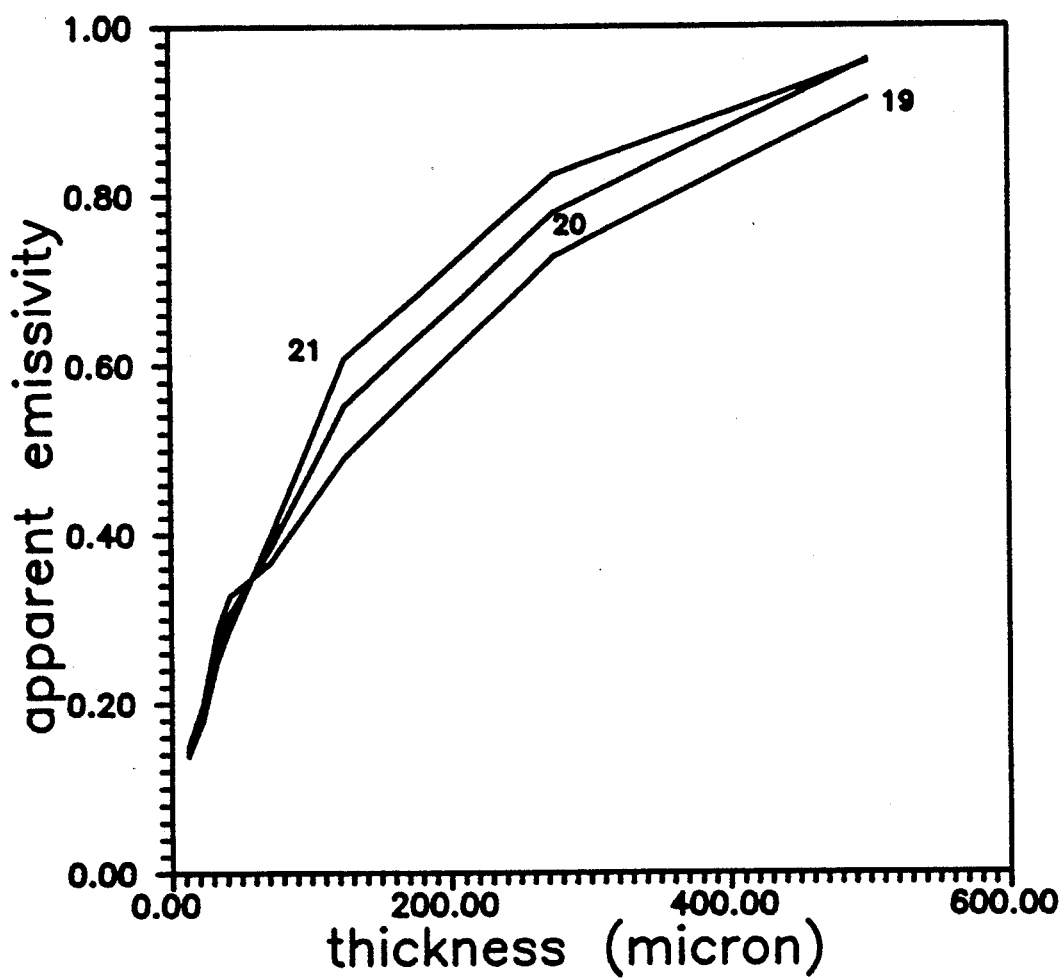
FIG. 4 is a graph of apparent emissivity of polyethylene as a function of film thickness at three melt temperatures.

Other radiation translucent materials, polymeric or non-polymeric, will exhibit similar relationships as those for polyethylene in FIG. 4, and the apparent emissivity-temperature-thickness function is readily determinable for any such material. The radiation is detected using a sensor chosen in a wavelength region where the material being measured is radiation translucent.

From the above, it should be appreciated that the present invention provides a method and apparatus for the non-contact determination of temperature profiles within a material. In particular, it is seen that the present invention advantageously employs a variable intensity radiation source and detectors for the determination of the bulk temperature and the surface temperatures of a material without prior knowledge of the material's thickness, apparent transmissivity, or apparent emissivity or the temperature dependence of these parameters. This method also eliminates the viscous heating problems associated with thermocouples and provides a method to measure temperature in situations where thermocouples can not be used, such as in single crystal production of gallium aresenide or silicon.

While the invention has been described in detail herein in accordance with certain preferred embodiments thereof, many modifications and changes therein may be effected by those skilled in the art. Accordingly, it is intended by the appended claims to cover all such modifications and changes that fall within the true spirit and scope of this invention.

The invention claimed is:

1. An apparatus for temperature profile determination in radiation translucent materials of arbitrary thickness comprising:

an optical path for radiation to pass through the material;

means of irradiating the material with a variable intensity radiation source such that radiation passes through the material;

means of detecting the level of said radiation transmitted through the material, said detecting means generating an electrical signal responsive to the intensity of said transmitted radiation;

a means for providing the surface temperature(s) of the material;

computing means for receiving electrical signals from the radiation detection means and operating thereon for the determination of the material apparent transmissivity, apparent emissivity, and average (bulk) temperature of said material;

computing means used in conjunction with said surface temperature(s) and average temperature, operating thereon for the calculation of temperature profiles and thickness of said material.

2. An apparatus of claim 1 in which the surface temperature data providing means comprises a radiation detecting device for generating electrical signals responsive to the material's radiation in the proximity of the surface.

3. An apparatus of claim 1 in which said radiation detection means operates to generate a signal responsive to the radiation energy of both the radiation source and the material.

4. An apparatus of claim 1 where said means of irradiating comprises a variable intensity radiation device.

5. An apparatus of claim 1 where the means of providing the radiation and the means for generating the signal as a function of radiation intensity are mounted on structures such that they can move in relationship to the monitored material.

6. An apparatus of claim 1 where the means for providing the radiation and the means for generating the radiation signal and operated thereon to determine the apparent emissivity, apparent transmissivity, and temperature of a polymer film.

7. An apparatus of claim 1 where the means for providing the radiation and the means for generating the radiation signal are operated thereon to determine the apparent emissivity, apparent transmissivity, and temperature of materials of unknown thickness.

8. An apparatus of claim 1 where the means of generation of the radiation signal is a detector in approximately the 1.8 to 3.0 micron wavelength and the means for providing the radiation is a variable temperature black body and the means for collecting and operating on the data is a computer.

9. An apparatus of claim 1 where the computational means operates for determination of apparent emissivity, apparent transmissivity, and temperature and further operates to determine the material thickness.

10. An apparatus of claim 1 in which said surface temperature data providing means comprises an infrared detecting device operating at approximately 3.43 micron wavelength for generating electrical signals responsive to the material's surface radiation.

11. An apparatus of claim 1 where the computational means operates for determination of apparent emissivity, apparent transmissivity, and temperature and material thickness which are to be utilized for process control.

12. A method for thickness determination and temperature profile determination of a radiation translucent material comprising:

transmitting radiation at multiple intensities through said material;

measuring the intensity of the radiation transmitted through said material;

providing data with respect to surface temperature of said material and determining using computer means multiple intensity measurements, and temperature data, an apparent emissivity, average material temperature, and a material thickness by using apparent emissivity-temperature-thickness data;

determination by computer means, utilizing said surface temperature data, average temperature, and thickness, a temperature profile across said material.

13. The method of claim 12 in which said data providing step comprises:

measuring the intensities of the radiation transmitted through the surface at multiple source intensities, determining the average bulk temperature; and correlation of said intensities or temperature with the surface temperature value.

14. A method of claim 12 where the determined temperature and/or thickness are used as process control parameters.

* * * * *